United States Patent [19]

Hatfield

[11] 3,743,027
[45] July 3, 1973

[54] DEVICE FOR CULTIVATING AROUND A FIXED OBJECT

[76] Inventor: Cecil T. Hatfield, 1608 Micheltorena St., Los Angeles, Calif. 90026

[22] Filed: Apr. 12, 1971

[21] Appl. No.: 133,285

[52] U.S. Cl. .................................. 172/13, 30/302
[51] Int. Cl. ............................................. A01d 35/00
[58] Field of Search ................ 172/13, 14, 15, 16, 172/17, 21

[56] References Cited
UNITED STATES PATENTS

| | | | |
|---|---|---|---|
| 1,866,073 | 7/1932 | Aberle | 172/13 |
| 1,965,177 | 7/1934 | Finkl | 172/21 |
| 3,143,176 | 8/1964 | Drane | 172/13 X |
| 2,615,246 | 10/1952 | Littig | 172/13 X |
| 2,691,823 | 10/1954 | Dombrowski | 172/15 UX |
| 3,554,293 | 1/1971 | Aman et al. | 172/13 |
| 2,733,100 | 1/1956 | Simonsen | 172/13 UX |
| 3,127,939 | 4/1964 | Rink | 172/13 X |
| 3,028,669 | 4/1962 | Caskey et al. | 172/13 UX |

Primary Examiner—Robert E. Pulfrey
Assistant Examiner—R. T. Rader
Attorney—Harris, Kiech, Russell & Kern

[57] ABSTRACT

A device for cultivating around a fixed object including a plurality of vertical cutting blades attached on a handle between outer and inner cylinders. The cutting blades are circumferentially spaced and obliquely positioned relative to the direction of rotation of the handle. Self-operating means surround each of the blades for expelling cultivated material downwardly away from the blades.

3 Claims, 10 Drawing Figures

PATENTED JUL 3 1973
3,743,027
SHEET 1 OF 2
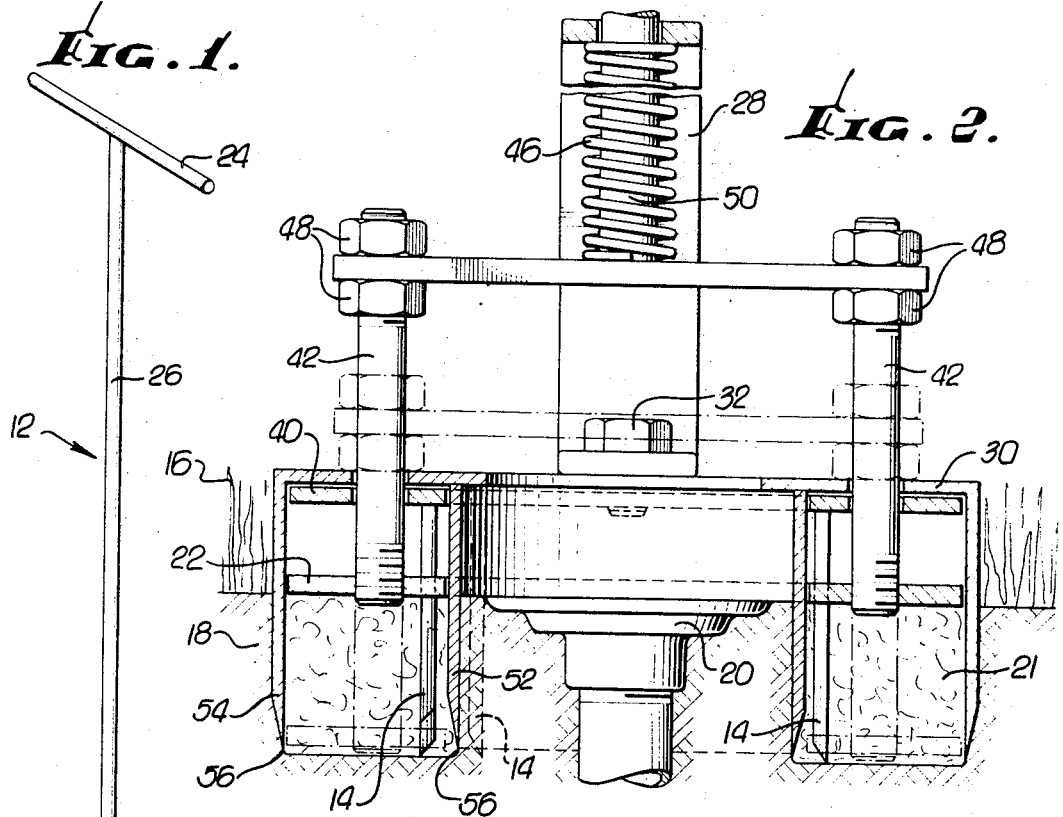
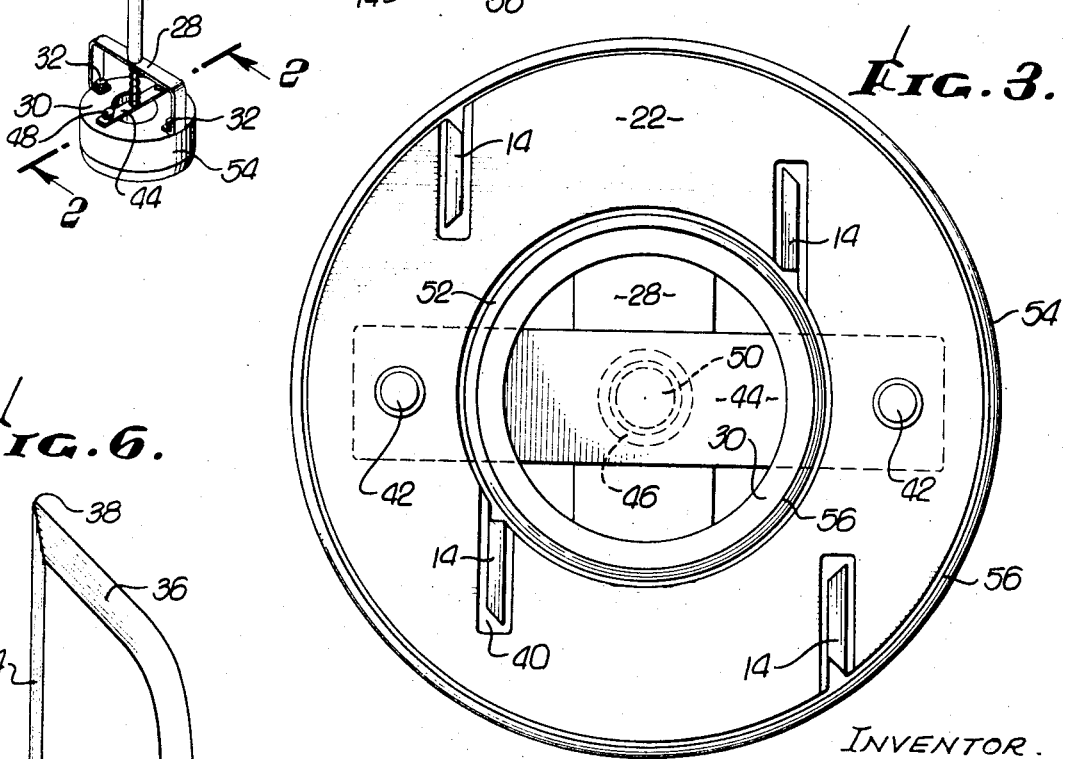
INVENTOR.
CECIL T. HATFIELD
BY HIS ATTORNEYS.
HARRIS, KIECH, RUSSELL & KERN

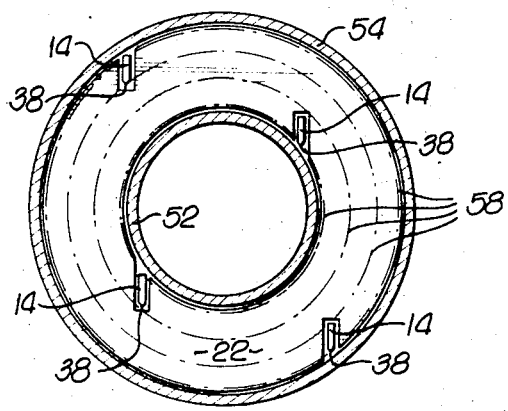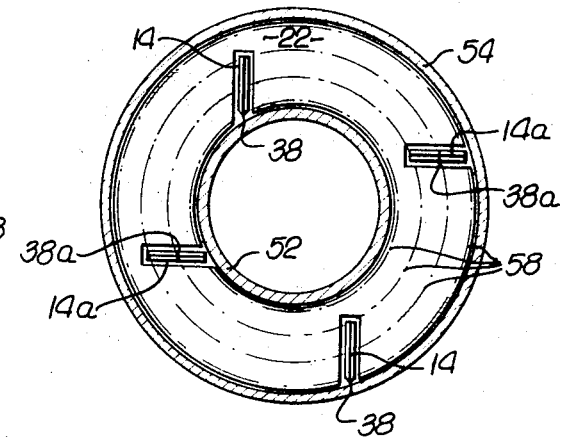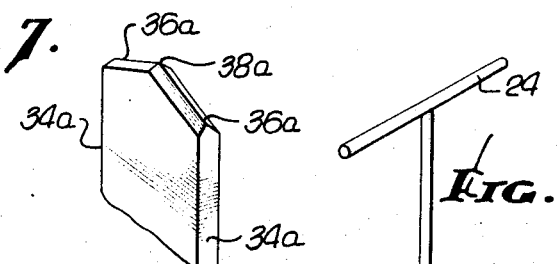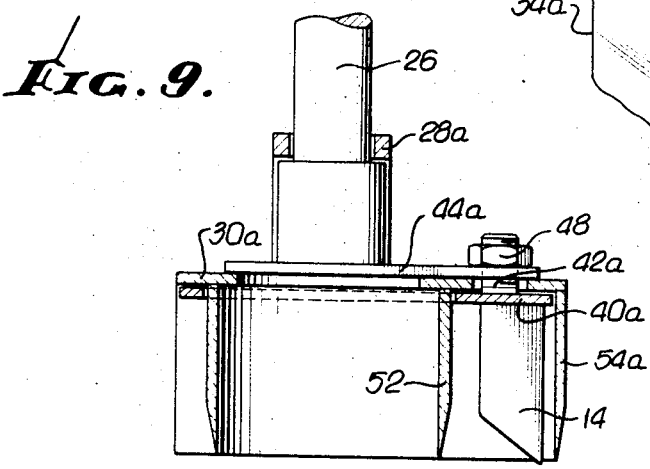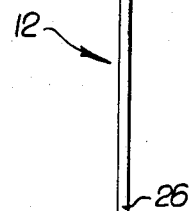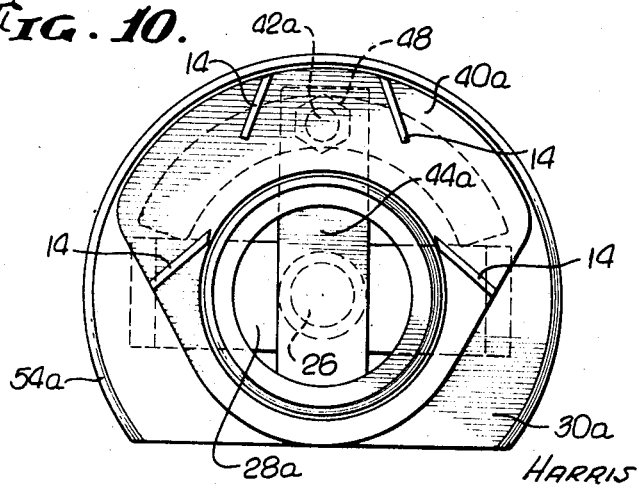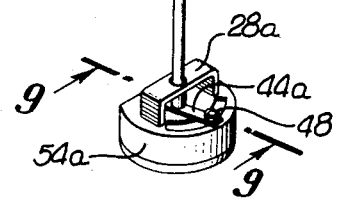
INVENTOR.
CECIL T. HATFIELD
BY HIS ATTORNEYS
HARRIS, KIECH, RUSSELL & KERN 3,743,027

DEVICE FOR CULTIVATING AROUND A FIXED OBJECT

This invention relates generally to cultivators and more particularly to cultivators for use around a fixed object such as a sprinkler head or the like which is in the middle portion of a lawn or garden, or is adjacent an uncultivatable boundary such as a sidewalk, driveway, or wall.

Cultivating the ground and controlling the vegetation around a fixed object such as a sprinkler head are perennial problems. Prior art devices have taken the form of lawn trimmers, sod slicers and/or combinations thereof. Many rest on the top of the sprinkler often causing damage to the sprinkler head. Others merely trim the grass and weeds, thereby only temporarily solving the problem. None of them provides adequate mulching and pulverizing of the vegetation and dirt together, or automatically deposits all such cultivated material back to its original location around the fixed object.

Accordingly, it is a general purpose of the invention to overcome the foregoing problems of the prior art devices and provide an improved device for semi-permanently inhibiting the growth of grass, weeds, and other vegetation around a fixed object such as a sprinkler, and for thoroughly cultivating the ground around such a fixed object without damaging the object.

Another general purpose is to provide a cultivating device which thoroughly mulches and pulverizes the vegetation and dirt around such a fixed object, and then automatically deposits the resulting mixture back to its original location without leaving any residue on the object or in the device.

Another purpose is to provide a device for cultivating around a fixed object which utilizes a plurality of vertical cultivating blades which are shaped, spaced, and aligned relative to each other and to the direction of rotation to achieve optimum mulching of the vegetation and dirt surrounding the object.

A further purpose is to provide a device having the aforementioned characteristics which provides self-operating means surrounding the cultivating blades for expelling cultivated material downwardly away from the blades.

Another purpose is to provide a device having the aforementioned characteristics which provides a plurality of vertical cutting blades attached on a handle between inner and outer cylinders so that the cultivating blades are circumferentially spaced and obliquely positioned relative to the direction of rotation of the handle. A related purpose is to provide cutting points so that each such point on the blades is spaced a different radial distance from the vertical axis of rotation of the handle.

Another purpose is to provide a device having the aforementioned characteristics which is adaptable for use around a fixed object located adjacent an uncultivatable boundary. A related purpose is to provide an outer cylinder rotatably attached to the handle and having a lateral truncation for fitting against the boundary, with stop means for preventing any rotation of the cultivating blades past the lateral truncation.

Still another object is to provide a device having the aforementioned characteristics which is inexpensive to make, easy to disassemble for repair or sharpening, and which can be effectively operated in a safe and simple manner around variously sized objects such as a sprinkler head without damaging either the device or the fixed object.

Further purposes, objects, features and advantages of the invention will be evident to those skilled in the art from the following description of the various embodiments and alternative forms of the invention.

In the drawings:

FIG. 1 is an isometric projection of a preferred embodiment of the invention;

FIG. 2 is a sectional view taken along line 2—2 in FIG. 1 showing the preferred embodiment of FIG. 1 with its expulsion plate partially depressed by the accumulation of mulched material around the cultivating blades;

FIG. 3 is a bottom plan view of the embodiment of FIG. 1;

FIG. 4 is a bottom plan view similar to FIG. 3 showing an alternate form and positioning of cultivating blades;

FIG. 5 is a bottom plan view similar to FIG. 3 showing another alternate form and positioning of cultivating blades;

FIG. 6 shows a preferred shape of cultivating blade;

FIG. 7 shows an alternate shape of cultivating blade;

FIG. 8 shows an isometric projection of a preferred embodiment of the invention for use against an uncultivatable boundary;

FIG. 9 is a sectional view taken along line 9—9 in FIG. 8; and

FIG. 10 is a bottom plan view of the embodiment of FIG. 8.

Generally speaking, the invention provides a handle 12 having a plurality of prepositioned cultivating blades 14 for pulverizing and mulching the vegetation 16 and dirt 18 immediately adjacent a fixed object, such as a sprinkler head 20, to produce a cultivated material 21. Self-operating expulsion means are provided such as a spring-biased expulsion plate 22 surrounding the cultivating blades 14, in order to automatically expel any accumulation of the cultivated material 21 which builds up around the blades 14 during rotary operation of the device about the vertical axis of the handle 12.

More particularly, the illustrated embodiment of FIGS. 1, 2, and 3 includes a handle 12 having a horizontal handpiece 24, a vertical axle 26, an inverted U-shaped brace 28 and a horizontal disc-shaped hanger 30. The handpiece 24 is fixedly attached at about its mid-point to the upper end of the vertical axle 26. The lower end of the vertical axle 26 is suitably attached as by welding to the brace 28 which carries the hanger 30 on bolts 32 therebelow.

The cutting blades 14 are preferably shaped as shown in FIG. 6 having both sides 34 and top 36 sharpened, as by single bevel sharpening. The sharpened cutting edges are tapered to form a single prominently extending cutting point 38 aligned with one of the sharpened sides 34. An alternatively shaped cutting blade 14a is shown in FIG. 7 wherein the top 36a is sharpened, as by double beveling, and tapered to form a single prominently extending cutting point 38a midway between the unsharpened sides 34a. A plurality of cutting blades 14 are fixedly mounted in a predetermined pattern on a circular mounting plate 40 which is removably secured by bolts 32 underneath the hanger 30. The blades 14 are spaced circumferentially from each other and are positioned obliquely relative to the circular direction of rotation about the vertical axis of the handle 12.

The self-operating expulsion means for automatically expelling any accumulation of cultivated material 21 which may build up around the blades 14 includes the plate 22, spacing rods 42, an inverted T-shaped member 44 and a biasing spring 46. The plate 22 is perforated with slots conforming to the predetermined pattern of the cutting blades 14 to allow the plate to move up and down while surrounding the blades 14. The spacing rods 42 are vertically inserted through aligned holes in the expulsion plate 22, the mounting plate 40, the hanger 30 and the T-shaped member 44. The holes in the expulsion plate 22 are threaded to removably mount the expulsion plate on threaded lower ends of the spacing rods 42. The upper ends of the spacing rods 42 are also threaded to carry nuts 48 securing the T-shaped member 44 to the rods. The biasing spring 46 surrounds the stem 50 of the T-shaped member 44 and abuts against the underside of the U-shaped brace 28 while the stem of the T-shaped member extends through a hole in the U-shaped brace 28 into the hollow lower end of the vertical axle 26.

The circular mounting plate 40 and the expulsion plate 22 are both sized to fit between inner and outer cylinders 52, 54 which are mounted concentrically under the hanger 30 and vertically aligned with the hanger's inner and outer peripheries, respectively. The cylinders 52, 54 are preferably sharpened to form lower cutting edges 56.

When the device is not in operation, the biasing spring 46 pushes the expulsion plate 22 downward to the bottom of the cavity defined by the inner and outer cylinders 52,54, at which time the lower of the nuts 48 contacts the hanger 30 and stops any further downward movement of the plate 22. If necessary the spacing rods 42 can be lengthened so that the expulsion plate 22 in its normal lowered position is located below both the cutting points 38 of the cultivating blades 14 and also below the cutting edges 56 of the inner and outer cylinders 52, 54, thus protecting both the supporting surface and nearby persons from being cut.

To operate the preferred embodiment of FIGS. 1, 2, 3, and 6, the cultivating device is placed over the top of and around a sprinkler 20 as best shown in FIG. 2. Manual rotation of the handpiece in either clockwise or counterclockwise direction about the vertical axis of the handle 12 causes the attached cutting blades 14 and inner and outer cylinders 52, 54 to similarly rotate. The downward manual force exerted during rotation easily overcomes the biasing spring 46 and causes the expulsion plate 22 to depress exposing the vegetation and dirt immediately surrounding the sprinkler 20 to the sharp cultivating edges 34, 36 and points 38 of the cultivating blades cylinders as well as to the sharp cutting edges 56 of the cylinders 54, 56. When the desired depth of cultivation is achieved, downward manual pressure is stopped and the device is lifted upwardly during which time the force of the biasing spring 46 causes the expulsion plate 22 to return to its normally lowered position automatically expelling the accumulation of cultivated material 21 back to the area surrounding the sprinkler.

The invention is not limited to the particular number and location of cultivating blades shown. For example, FIG. 4 shows an alternate arrangement where cutting blades 14 of the types shown in FIG. 6 have cutting points 38 each of which is spaced a different radial distance from the axis of rotation of the handle 12, thereby producing four separate deep-cutting cultivation paths 58. Also, with respect to the sides of the cultivating blades 14, those sides which are not adjacent to the cylinders 52, 54 are all inclined in the same direction. In this form, the cultivating blades 14 extend less than half the radial distance between the inner and outer cylindres 52, 54.

In FIG. 5, another alternate arrangement provides cutting blades 14 and 14a of both types shown in FIGS. 6 and 7 having cutting points 38, 38a which are again spaced different radial distances from the axis of rotation of the handle 12 to produce separate deep-cutting cultivation paths 58. However, here the aforementioned sides not adjacent to the cylinders 52, 54 are both forwardly and rearwardly inclined with respect to a given circular rotation of the handle 12 about its vertical axis. In this form, the cultivating blades extend more than half the radial distance between the inner and outer cylinders 52, 54.

It is emphasized that in each different form and embodiment, the cultivating blades 22 are positioned obliquely relative to the direction of rotation to achieve a unique improved cultivation not possible with blades merely parallel or perpendicular to the direction of rotation.

FIGS. 8, 9, and 10 show a preferred embodiment of the invention for use against uncultivatable boundaries.

Where possible, the identification numerals used here correspond to the identification numerals for the same or similar parts in the embodiment of FIGS. 1, 2, and 3. Here the handle 12 includes the vertical axle 26 fixedly attached through a truncated inverted T-shaped member 44a, shortened spacing rod 42a and nuts 48 to a truncated circular mounting plate 40a carrying a plurality of vertically mounted blades 14 spaced circumferentially from each other and positioned obliquely relative to the direction of rotation of the handle 12 about its axis.

However, the inner cylinder 52 and truncated outer cylinder 54a are not fixedly attached to the handle 12, but rather are mounted on a truncated hanger 30a connected for rotatable movement relative to the handle 12 through a shortened inverted U-shaped hanger 28a to the axle member 26. A circular slot is provided in the hanger 30a for the spacing rod 42a to ride in during oscillation of the cultivating blades 14.

The end portions of the slot and the hanger 28a both stop the spacing rod 42a and its attached blades 14 from oscillating too far in either direction.

Thus, it will be appreciated that by placing the device over a sprinkler so that the various truncated and shortened parts face and/or abut against the driveway, sidewalk, or other boundary, oscillating rotation of the handle 12 still accomplished corresponding oscillating rotation of the cultivating blades 14 to cultivate around the sprinkler and adjacent to the boundary.

Although an exemplary embodiment and some alternative forms of the invention have been disclosed and discussed, it will be understood that other applications of the invention are possible, and that the emobidments and forms disclosed may be subjected to various changes, modifications, and substitutions without necessarily departing from the spirit of the invention.

I claim:

1. A device for cultivating underlying material around a fixed object of a predetermined diameter including:
   a handle rotatable in a circular direction about a vertical axis;
   a mounting plate connected to and extending laterally from a lower end of said handle;
   inner and outer vertical cylinders attached to said mounting plate concentric with said vertical axis, said inner cylinder having a diameter greater than said predetermined diameter of said fixed object;
   a plurality of circumferentially spaced flattened vertical cultivating blades positioned on said mounting plate between said inner and outer cylinders, each of said cultivating blades defining and lying in a plane parallel to said vertical axis and oblique relative to said circular direction and to the radially adjacent portions of said cylinders and having bottom edge means for scraping the underlying material, with said inner and outer vertical cylinders terminating in bottom cutting edges in substantial lateral alignment with said bottom edge means of said cultivating blades; and
   a horizontal plate member between said inner and outer vertical cylinders having access slots which allow passage of said cultivating blades respectively for cleaning any underlying material stuck between said cylinders and being movable from a normally lowered position adjacent said bottom cutting edges of said cylinders and said bottom edge means of said cultivating blades to a raised position adjacent said mounting plate.

2. A device as defined in claim 1 wherein said cultivating blades and said access slots do not extend the full distance between said inner and outer cylinders, and wherein some of said bottom edge means of said cultivating blades are spaced at different radial distances from said vertical axis.

3. A device as defined in claim 1 in which the fixed object is adjacent an uncultivatable surface, and wherein
   said outer cylinder includes a laterally truncated side for positioning adjacent the uncultivatable surface, and
   said mounting plate includes means for allowing said blades to rotate relative to said cylinders about said vertical axis including stop means for preventing rotation of said blades past the laterally truncated side of said outer cylinder.

* * * * *